United States Patent

[11] 3,607,622

[72] Inventor Herbert H. Espy
 Fairfax, Wilmington, Del.
[21] Appl. No. 747,090
[22] Filed July 24, 1968
[45] Patented Sept. 21, 1971
[73] Assignee Hercules Incorporated
 Wilmington, Del.

[54] AMINOPOLYAMIDE-ACRYLAMIDE-POLYALDEHYDE RESINS HAVING UTILITY AS WET AND DRY STRENGTH AGENTS, RETENTION AIDS AND FLOCCULANTS AND A PROCESS OF MAKING AND USING THEM AND PAPER MADE THEREFROM
22 Claims, No Drawings

[52] U.S. Cl. .................................................. 162/167,
 162/164, 210/54, 260/72 R, 260/850
[51] Int. Cl. .................................................. D21h 3/58,
 C02b 1/20, C08g 9/02
[50] Field of Search........................................... 260/72,
 850; 162/164, 167, 166, 169, 168, 189, 190;
 210/52–54

[56] References Cited
UNITED STATES PATENTS

| | | | |
|---|---|---|---|
| 2,616,818 | 11/1952 | Azorlosa ...................... | 260/72 X |
| 2,886,557 | 5/1959 | Talet ........................... | 260/72 |
| 3,420,735 | 1/1969 | Conte et al. .................. | 162/167 |

Primary Examiner—S. Leon Bashore
Assistant Examiner—Frederick Frei
Attorney—Charles L. Board ABSTRACT: Disclosed is a novel aminopolyamide—acrylamide—polyaldehyde resin useful in the paper making art to enhance the wet and dry strength of paper. Small amounts of the resin can also be used as a retention aid for mineral fillers in paper and as a flocculant for suspended matter.

AMINOPOLYAMIDE-ACRYLAMIDE-POLYALDEHYDE RESINS HAVING UTILITY AS WET AND DRY STRENGTH AGENTS, RETENTION AIDS AND FLOCCULANTS AND A PROCESS OF MAKING AND USING THEM AND PAPER MADE THEREFROM

This invention relates to wet strength resins, the process of incorporating them into paper and the paper so treated.

Various resins which impart wet strength to paper are known in the art. However, most of the prior art resins are of the permanent type, i.e., paper treated with them retains its wet strength long after immersion in water, which is desirable in packaging materials but presents a disposal problem. A few resins are known which impart temporary wet strength and would thus be suitable for sanitary or disposable paper uses, but each of them suffers from one or more serious drawbacks. For example, their wet strength efficiency is seriously decreased by alum, they are easily attacked by mold and slime, they can only be prepared as dilute suspensions or they must be sized into preformed paper because they are not substantive to pulp.

It is an object of this invention to provide resins which impart both dry and wet strength to paper.

It is a further object of this invention to provide wet strength resins such that paper treated with them loses its strength on prolonged immersion in water such as on disposal in sanitary systems, and facilitates the handling of broke in the paper mill.

It is a further object of this invention to provide resins which impart their ultimate wet strength on drying alone without curing and are substantive to pulp without sizing.

It is a further object of this invention to provide wet strength resins which can be prepared in high solids concentrations.

It is a further object of this invention to provide wet strength resins which are not easily attacked by mold and slime growth.

It is a further object of this invention to provide wet strength resins which are more stable towards gelation on storage.

It is a further object of this invention to provide wet strength resins whose efficiency is not seriously reduced by alum.

It is a further object of this invention to provide resins which act as retention aids for mineral fillers in paper and as flocculants and precipitants for suspended matter.

Now in accordance with this invention these objectives and many others have been achieved by preparing a wet strength resins from an aminopolyamide, an acrylamide and a polyaldehyde.

The wet strength resins of this invention are prepared by (1) reacting an aminopolyamide, containing primary and/or secondary amine groups, with an acrylamide and (2) reacting the resulting adduct with a polyaldehyde.

Any aminopolyamide containing at least one primary or secondary amine group and resulting from the condensation of a polyalkylene polyamine with an organic polybasic acid can be used in preparing the resins of this invention. The polyalkylene polyamines which can be used to prepare the aminopolyamides will have the general formula

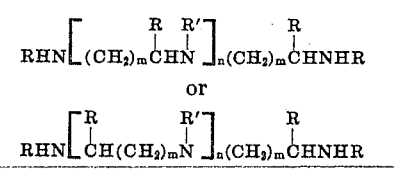

where $m$ is an integer from 1 to 5, $n$ is at least 1, each $R$ independently of each other is selected from the group consisting of hydrogen and lower alkyl radicals and $R'$ is selected from the group consisting of hydrogen and amino substituted lower alkyl radicals. Typical polyalkylene polyamines are diethylenetriamine, dipropylenetriamine, triethylenetetraamine, tetraethylenepentaamine, pentaethylenehexaamine, imino-bis(3-aminopropyl)amine, bis(3aminopropyl)ethylenediamine, bis(2-aminoethyl)-1,3-diaminopropane, bis(3-aminopropyl)-1,3-diaminopropane, $N^1,N^3$-dimethyl-diethylene-triamine, tris(2-aminoethyl)amine, and polyethyleneimine. Typical of the polybasic acids which can be used in the preparation of these compounds are the saturated aliphatic acids such as succinic, glutaric, 2-methylsuccinic, adipic, pimelic, suberic, azelaic, sebacic, hendecandioic, dodecandioic, 2-methylglutaric, 3,3-dimethylglutaric and tricarboxypentanes such as 4-carboxypimelic; the alicyclic saturated acids such as 1,2-cyclohexanedicarboxylic, 1,3-cyclohexanedicarboxylic, 1,4-cyclohexanedicarboxylic and 1,3-cyclopentanedicarboxylic; the unsaturated aliphatic acids such as maleic, fumaric, itaconic, citraconic, mesaconic, aconitic and hexene-3-dioic, the unsaturated alicyclic acids such as $\Delta^4$-cyclohexenedicarboxylic; the aromatic acids such as phthalic, isophthalic, terephthalic, 2,3-naphthalenedicarboxylic, benzene-1,4-diacetic, 4-methylphthalic and trimellitic; and the heteroaliphatic acids such as diglycolic, thiodiglycolic, dithiodiglycolic, iminodiacetic, and methyliminodiacetic. It will be understood that esters, amides of lower amines, and anhydrides of the above acids can be reacted with the above polyalkylene polyamines to give equivalent aminopolyamides.

The condensation reaction can be carried out by heating the polyalkylene polyamine with the polybasic acid at a temperature of from about 110° C. to about 250° C. Optionally the reaction will be carried out in a diluent to aid in mixing and absorb the heat of neutralization of the acid by the amine. Care should be taken not to use too great an excess of acid lest irreversible gelation of the polyamide occur and all the amine groups be converted to amides with no amine left for later reaction. In general from about 0.5 to about 2.0, preferably from about 1.0 to about 1.3 moles of polyalkylene polyamine per mole of acid will be used. The course of the reaction can be followed by monitoring the melt viscosity. The reaction will ordinarily be continued until the reduced specific viscosity of the polyamide lies in the range of 0.05 to 0.5. Reduced specific viscosity is defined herein as $\eta sp/c$ measured at 25° C. in aqueous one molar ammonium chloride, where $c=2.0$ percent (weight polymer/volume solution).

As stated above, in the preparation of the resins of this invention the aminopolyamide is reacted with an acrylamide, including lower alkyl substituted acrylamides such as methacrylamide, α-ethylacrylamide, and crotonamide. Most preferably, a sufficient amount of the acrylamide will be used to react with substantially all of the amine groups in the aminopolyamide. In practice an excess of acrylamide helps to drive the carbamidoethylation of the amines to substantial completion in a reasonable time. The reaction between the aminopolyamide and acrylamide can be carried out at any temperature between about 20° C. and the boiling point of the reaction mixture at the solids concentration used. Temperatures between about 60° C. and about 110° C. are most preferred. A high pH during the reaction is favored since this frees the amine groups from their salts. Ordinarily the natural pH of the aminopolyamide solution is satisfactory but it may be adjusted if necessary.

If desired a lightly alkylated resin can be produced by adding a small amount of an alkylating agent, such as an epihalohydrin or alkyl sulfate, either before, during or after the reaction of the aminopolyamide with the acrylamide. If the alkylation is carried out before reaction with an acrylamide, a few of the secondary amine groups in the aminopolyamide molecule will be converted to tertiary amines or quaternary salts. If it is added after the formation of the aminopolyamide—acrylamide adduct, it will substitute itself in the place of a few acrylamides. It should be pointed out that alkylation is not essential to the process of this invention and excellent results are achieved when using resins which have not been alkylated.

The final reaction in the preparation of the wet strength resins of this invention is between the aminopolyamide— acrylamide adduct and a polyaldehyde. Typical polyaldehydes which may be used in the final reaction are glyoxal, malonic aldehyde, succinic aldehyde, glutaraldehyde, adipic aldehyde, 2-hydroxyadipaldehyde, pimelic aldehyde, suberic aldehyde, azelaic aldehyde, sebacic aldehyde, maleic aldehyde, fumaric aldehyde, dialdehyde starch, polyacrolein, phthalaldehyde, isophthalaldehyde terephthalaldehyde, 1,3,5-triformylbenzene, and 1,4-diformylcyclohexane. This reaction is generally carried out at a pH of from about 5 to about 10 and a temperature in the range of from about 20 to 80° C. Mole ratios of polyaldehyde to acrylamide in the aminopolyamide—acrylamide adduct will be between about 0.05 and about 5.0, most preferably between about 0.1 to about 3.0. The resulting wet strength resin will have a Brookfield viscosity of from about 5 c.p.s. to about 200 c.p.s. as determined on a Brookfield Model LVF viscometer using a No. 1 spindle rotating at 60 r.p.m.

When using the wet strength resins of this invention in papermaking, they can be added at any time before, during or after the paper is formed. For example, the resin can be added before or after the refining of the pulp, at the fan pump or head box, or by spraying on the wet web. The resin can also be added to preformed paper by tub sizing or spraying on the dried paper sheets. In most commercial papermaking it will be preferred to add the resin at the fan pump or head box in the form of an aqueous solution of up to 15 percent solids. Various amounts of the resin can be used. When used to impart wet strength, the amount of resin added will be sufficient to result in a paper containing from about 0.05 percent to about 5 percent by weight based on the weight of the paper. When used purely as a retention aid and no wet strength is desired, less than 0.05 percent by weight based on the weight of the paper can be used. The actual amount for any specific purpose can be easily determined by one skilled in the art. As stated above, no heat curing is required with the resins of the instant invention since they develop their optimum strength on normal drying. They can be added to paper over a wide range of pH values. However, best results are obtained by adding the resin to the paper at an acid pH of from about 1 to about 8 most preferably from about 3 to about 6.

Other ingredients can be used in conjunction with the wet strength resins of this invention. The additives or ingredients commonly used in papermaking can be used here also as for example alum, rosin size, coating colors, mineral fillers, starch, casein, etc. The presence of other ingredients is not essential to this invention and excellent results are achieved when using only the wet strength resins of this invention.

It will be obvious to those skilled in the art that the wet strength resins of this invention can be incorporated into various types of paper such as kraft paper, sulfite paper, semichemical paper, etc. both bleached and unbleached. While the resins can be used in various types of paper, their advantages will be most sought in paper toweling or paper tissues such as toilet and facial tissues.

The following examples will serve to illustrate the invention, parts and percentages being by weight unless otherwise indicated.

EXAMPLE 1

This example shows the preparation of and use in papermaking of a typical wet strength resin in accordance with this invention.

To a mixture of 340.5 parts of tetraethylenepentamine and 75 parts of water is added 219 parts of adipic acid. The resulting mixture is heated gradually to 170° C. and held between 170 and 177° C. for 5.2 hours during which time the original water added and the water formed in the reaction is allowed to distill off. At the end of this time the mixture is cooled to 144° C. and diluted with about 492 parts of warm water. The resulting solution contains approximately 49 percent total solids and has a reduced specific viscosity of about 0.33. To 457.5 parts of the above solution is added 438.5 parts of water followed by 213 parts of acrylamide. The resulting mixture is heated to 70° C. and held between 70 and 75° C. for two hours and then cooled. The thus cooled solution contains about 40.1 percent total solids. To 72.8 parts of the above aminopolyamide—acrylamide adduct solution is added 73.2 parts of water and the pH adjusted to 7.0 by adding 5.4 parts of 9.66 normal (37 percent) sulfuric acid. To the thus acidified solution is added 29 parts of 40 percent aqueous glyoxal and the resulting mixture heated to 50 to 55° C. After 45 minutes the viscosity of the mixture reaches a Gardner-Holdt value of about K (determined using a sample cooled to 25° C.). The resin solution is diluted with 97 parts of water, cooled, and adjusted to a pH of 5.0 with sulfuric acid. The resulting wet strength resin solution contains about 15.5 percent total solids and has a Brookfield viscosity of about 41.4 c.p.s. at 25° C. After storage for 90 days at room temperature a sample of the wet strength resin solution shows no signs of mold or slime.

Rayonier bleached kraft pulp is beaten in a cycle beater to a Schopper-Riegler freeness of 750 cc. Portions of this pulp, adjusted to a pH of 4.5 with sulfuric acid, are added to the proportioner of a Noble-Wood handsheet forming machine. Samples of the above wet strength resin are added to the proportioner in amounts of 0.5 percent, 1 percent, and 2 percent resin solids by weight of pulp solids. The pulp is then formed into handsheets of about 40 pounds per 3,000 square foot basis weight and dried for one minute at a temperature of 110° C. A control handsheet is prepared exactly as described above except it contains no wet strength resin. The resulting handsheets after conditioning at a temperature of 75° F. and 50 percent relative humidity for over 24 hours are tested for dry tensile strength and wet tensile strength after soaking for 10 seconds in distilled water. The wet tensile strength expressed as a percentage of dry tensile strength is tabulated below:

| Percentage of Resin Contained in Paper | Wet Tensile Percent of Dry Tensile |
| --- | --- |
| None | 1.5 |
| 0.5 | 18.8 |
| 1.0 | 23.1 |
| 2.0 | 28.2 |

EXAMPLE 2

This example shows the preparation and use of a wet strength resin treated with a small amount of alkylating agent.

An aminopolyamide-acrylamide adduct is prepared as described in Example 1. To 70.4 parts of a 41.5 percent total solids solution of the adduct is added 75.6 parts of water. To the resulting solution is added 0.92 parts of epichlorohydrin with heating. The solution is held at a temperature of between 68° C. and 75° C. for approximately 1 hour and then cooled to 25° C. adjusted to a pH of 7.5 with sulfuric acid and then treated with 58 parts of 40 percent aqueous glyoxal. The resulting mixture is heated to 50° C. and held between 50 and 55° C. for 48 minutes during which time the viscosity reaches a Gardner-Holdt value of about L. The resulting wet strength resin solution is diluted with about 328 parts of water cooled to 25° C. and the pH adjusted to about 4.9 with sulfuric acid. The resulting solution contains about 9.3 percent solids and has a Brookfield viscosity of about 7.7 c.p.s. at 25° C. After storage for 90 days at room temperature a sample of the wet strength resin solution shows no signs of mold or slime.

Bleached kraft paper is prepared using the above wet strength resin as described in Example 1. Samples of the thus prepared paper are tested for dry and wet strength also as described in Example 1. The wet strength, expressed as a percentage of dry strength is tabulated below.

| Percentage of Resin Contained in Paper | Wet Tensile Percent of Dry Tensile |
| --- | --- |
| None | 1.8 |
| 0.5 | 17.1 |
| 1.0 | 21.3 |
| 2.0 | 28.6 |

EXAMPLE 3

This example shows the preparation and use of a wet strength resin prepared from triethylenetetramine.

To a resin kettle containing 142 parts of triethylenetetramine is added 146.1 parts of adipic acid. The mixture is heated to 170° C. with stirring and maintained between 170 and 173° C. for 69 minutes. The resin melt is then cooled to 140° C. and diluted with about 234 parts of warm water. The resulting solution contains approximately 51.4 percent total solids and has a reduced specific viscosity of about 0.193. To 124.5 parts of the aminopolyamide solution is added 131.5 parts of water along with 35.6 parts of acrylamide. The resulting mixture is heated at 70 to 75° C. for 2 hours and then cooled. The resulting mixture is heated at 70 to 75° C. for 2 hours and then cooled. The resulting solution contains approximately 35.1 percent solids. To 169.8 parts of the above aminopolyamide—acrylamide adduct solution is added 8.8 parts of water. The pH is adjusted to 7.4 with sulfuric acid and then treated with 43.6 parts of 40 percent aqueous glyoxal solution. The resulting mixture is heated to 50° C. and maintained at this temperature for 56 minutes. At the end of this time the Gardner-Holdt viscosity is equal to about E at 25° C. The resulting wet strength resin solution is diluted with approximately 288 parts of water, cooled and its pH adjusted to 4.8 with sulfuric acid. The resulting product contains approximately 14.9 percent solids and has a Brookfield viscosity of 14.4 c.p.s. at 25° C. After storage for 90 days at room temperature, a sample of the product shows no signs of mold or slime.

Bleached kraft paper is prepared from the above described wet strength resin as described in Example 1. Wet strength tests are carried out also as described in Example 1. The results of these tests are tabulated below:

| Percentage of Resin Contained in Paper | Wet Tensile Percent of Dry Tensile |
| --- | --- |
| None | 1.8 |
| 0.5 | 13.4 |
| 1.0 | 16.8 |
| 2.0 | 21.6 |

EXAMPLE 4

This example shows the preparation and use of a wet strength resin prepared from dodecandioic acid.

To a mixture of 43.5 parts of tetraethylenepentamine and 10 parts of water is added 46.1 parts of dodecandioic acid. The reaction mixture is sparged with nitrogen and heated to a temperature of 170° C. The reaction is maintained between 170° C. and 190° C. for 45 minutes. The reaction product is then decanted and allowed to cool. To a solution of 57.5 parts of the above solid aminopolyamide in about 136.6 parts of methanol is added 42.7 parts of acrylamide. The resulting mixture is boiled under reflux for 3 hours, then the solvent is stripped under vacuum at a maximum temperature of about 72° C. The resulting adduct has a total solids content equal to about 86.2 percent. To 31 parts of the aminopolyamide—acrylamide adduct is added 85.7 parts of water and the whole adjusted to a pH of approximately 7.2 with sulfuric acid. The mixture is then treated with 23.2 parts of 40 percent aqueous glyoxal and heated to 50° C. After 35 minutes at a temperature of between 50 and 53° C. the viscosity of the mixture reaches a Gardner-Holdt value of about L. The resulting resin is diluted with 100 parts of water, cooled to 25° C. and adjusted to a pH of 4.9 with sulfuric acid. The final resin product solution has a total solids content of approximately 16 percent and a Brookfield viscosity of about 18.1 c.p.s. at 25° C. After storage for 90 days at room temperature, a sample of the resin product solution shows no signs of mold or slime.

Bleached kraft paper is prepared using the above wet strength resin as described in Example 1. Samples of the thus prepared paper are tested for wet strength, also as described in Example 1, and the results tabulated below.

| Percentage of Resin Contained in Paper | Wet Tensile Percent of Dry Tensile |
| --- | --- |
| None | 1.5 |
| 0.5 | 20.1 |
| 1.0 | 23.2 |
| 2.0 | 27.1 |

EXAMPLE 5

This example shows the preparation and use of wet strength resin prepared from succinic acid.

To a mixture of 181.8 parts of tetraethylenepentamine and 50 parts of water is added 94.5 parts of succinic acid. The mixture is heated to 170° C. with stirring while being sparged with nitrogen. After 4 hours at a temperature between 170° and 175° C. the hot product is decanted into a pan and allowed to cool. To a solution of 54.3 parts of the aminopolyamide in 163 parts of water is added 56.9 parts of acrylamide. The reaction mixture is heated to 70–75° C., held there for 2 hours and then cooled. The resulting solution contains approximately 41.9 percent total solids. To 66.4 parts of the above solution of aminopolyamide—acrylamide adduct is added 79.6 parts of water. The pH of the mixture is adjusted to 7.2 using sulfuric acid. The mixture is then treated with 29 parts of 40 percent aqueous glyoxal, heated to 50° C., and maintained between 50 and 55° C. for 170 minutes. The resin is cooled, diluted with 81 parts of water and adjusted to a pH of 5.0 using sulfuric acid. The resulting solution of wet strength resin contains approximately 15.2 percent total solids. After storage for 90 days at room temperature, a sample of the wet strength resin solution shows no signs of mold or slime.

Bleached kraft paper is prepared using the above resin as described in Example 1. Wet strength tests are carried out also as described in Example 1. The results are tabulated below.

| Percentage of Resin Contained in Paper | Wet Tensile Percent of Dry Tensile |
| --- | --- |
| None | 1.5 |
| 0.5 | 7.1 |
| 1.0 | 10.7 |
| 2.0 | 14.0 |

EXAMPLE 6

This example shows the preparation and use of a wet strength resin prepared from itaconic acid.

To a mixture of 166.7 parts of tetraethylenepentamine and 40 parts of water is added 104.1 parts of itaconic acid. The resulting mixture is heated to 171° C. and maintained between 168 and 188° C. for 184 minutes. The product melt is decanted and allowed to cool. The reduced specific viscosity of the aminopolyamide is approximately 0.16. To a solution of 141.7 parts of the above aminopolyamide in 328.3 parts of water is added 142.2 parts of acrylamide. The resulting mixture is heated to between 70 and 75° C. maintained at that temperature for approximately 2.75 hours, then cooled. The resulting solution contains approximately 45 percent solids. To 63.2 parts of the aminopolyamide—acrylamide adduct solution is added 78.8 parts of water. The resulting solution is adjusted to a pH of 7.4 with sulfuric acid and then treated with 29.0 parts of 40 percent aqueous glyoxal. The resulting solution is heated at 50–55° C. for 155 minutes, then cooled, diluted with 90 parts of water and adjusted to a pH of 4.9 with sulfuric acid. The resulting solution of wet strength resin contains approximately 15.5 percent total solids.

Bleached kraft paper is prepared using the above wet strength resin. Samples of the paper are tested for wet strength as described in Example 1 and the results of the tests are tabulated below.

| Percentage of Resin Contained in Paper | Wet Tensile Percent of Dry Tensile |
|---|---|
| None | 1.5 |
| 0.5 | 17.0 |
| 1.0 | 21.7 |
| 2.0 | 29.1 |

EXAMPLE 7

This example shows the preparation and use of a wet strength resin prepared from isophthalic acid.

To a mixture of 152.4 parts of tetraethylenepentamine and 40 parts of water is added 116.3 parts of isophthalic acid. The resulting mixture is heated to 170° C. and maintained between 170 and 177° C. for 166 minutes, then heated to 213° C. during a period of 40 minutes and maintained at a temperature between 213 and 225° C. for 50 additional minutes. The resulting product is decanted into a pan and allowed to cool. The product has a reduced specific viscosity of approximately 0.106. 62 parts of the aminopolyamide is dispersed in 186 parts of water containing approximately 0.55 parts of concentrated sulfuric acid. The mixture is treated with 56.9 parts of acrylamide, heated to 70 to 75° C. and held at this temperature for 3 hours. After cooling the solution contains approximately 40 percent total solids. The above aminopolyamide—acrylamide adduct solution is diluted with 70.6 parts of water, adjusted to a pH of 7.5 with sulfuric acid and then treated with 29 parts of 40 percent aqueous glyoxal. The resulting mixture is heated to 54–55° C. and maintained at this temperature for about 75 minutes, at which time the mixture forms a light gel. The gel is dispersed by the addition of approximately 103 parts of water, cooled and adjusted to a pH of 4.55 with sulfuric acid. The resulting solution of wet strength resin contains approximately 15.2 percent total solids and has a Brookfield viscosity of about 42.1 c.p.s. at 25° C.

Bleached kraft paper is prepared using the above wet strength resin as described in Example 1. Samples of the paper are tested for wet strength also as described in Example 1 and the results are tabulated below.

| Percentage of Resin Contained in Paper | Wet Tensile Percent of Dry Tensile |
|---|---|
| None | 1.6 |
| 0.5 | 19.9 |
| 1.0 | 23.2 |
| 2.0 | 29.2 |

EXAMPLE 8

This example shows the preparation and use of a wet strength resin from the aminopolyamide—acrylamide adduct of Example 1 using glutaraldehyde in place of glyoxal.

To 72.8 parts of the aminopolyamide—acrylamide adduct solution described in Example 1 is added 80 parts of 25 percent aqueous glutaraldehyde. The resulting mixture is adjusted to a pH of 7.8 with sulfuric acid, and heated to 50° C. After 139 minutes at this temperature the resin reaches a viscosity of R on the Gardner-Holdt scale. The resin is diluted with 129 parts of water, cooled and adjusted to a pH of 4.9 with sulfuric acid. The resulting resin solution contains approximately 16.5 percent total solids and has a Brookfield viscosity of 55.6 c.p.s. at 25° C.

Bleached kraft paper is prepared using the above wet strength resin as described in Example 1. Samples of the paper are tested for wet strength also as described in Example 1 and the results tabulated below.

| Percentage of Resin Contained in Paper | Wet Tensile Percent of Dry Tensile |
|---|---|
| None | 1.8 |
| 0.5 | 9.7 |
| 1.0 | 12.1 |
| 2.0 | 14.4 |

EXAMPLE 9

This example shows the preparation and use of a wet strength resin using diethylenetriamine.

To 138.75 parts of diethylenetriamine is added 201 parts of adipic acid. The resulting mixture is heated to 165° C. and maintained at a temperature of between 165 and 175° C. for 180 minutes. The mixture is then cooled and diluted to about 51.1 percent solids by the addition of water. The resulting aminopolyamide has a reduced specific viscosity of 0.154. To 416.8 parts of the above aminopolyamide solution is added 87.4 parts of water and 78.2 parts of acrylamide. The mixture is heated at about 70–75° C. for 2 hours and then cooled. The resulting mixture contains approximately 52.9 percent total solids. To 107.3 parts of the above aminopolyamide—acrylamide adduct solution is added 34.7 parts of water. The solution is adjusted to a pH of 7.5 using sulfuric acid and treated with 32.0 parts of 40 percent aqueous glyoxal. The resulting mixture is heated to 50° C. and held between about 50° C. and 60° C. for 4.1 hours. At the end of this time the Gardner-Holdt viscosity has increased to between E and F. The resin is cooled and diluted with about 290 parts of water and the pH adjusted to 5 with sulfuric acid. The resulting solution of wet strength resin contains approximately 14.5 percent total solids and has a Brookfield viscosity of 7.1 c.p.s.

Bleached kraft paper is prepared from the above wet strength resin as described in Example 1. Samples of the paper are tested for wet strength also as described in Example 1 and the results are tabulated below.

| Percentage of Resin Contained in Paper | Wet Tensile Percent of Dry Tensile |
|---|---|
| None | 1.8 |
| 0.5 | 5.2 |
| 1.0 | 6.8 |
| 2.0 | 9.0 |

Example 10

This example shows the preparation and use of wet strength resin from an aminopolyamide treated with a small amount of dimethyl sulfate.

To 189 parts of tetraethylenepentamine is added 146.1 parts of adipic acid and the mixture heated to 170° C. with stirring. The mixture is maintained at a temperature of between about 168 and 172° C. for 42 minutes, then the resin melt cooled to 140° C. and diluted with approximately 292 parts of warm water. After cooling the resulting solution contains about 51 percent solids and has a reduced specific viscosity of about 0.187. To 292.5 parts of the aminopolyamide solution is added successively 305 parts of water and 106.7 parts of acrylamide. The resulting mixture is heated at 70–75° C. for 2 hours and cooled. The resulting solution contains 35.3 percent total solids. To 72.6 parts of the aminopolyamide—acrylamide adduct solution is added 55.4 parts of water and 0.63 parts of dimethyl sulfate. The mixture is heated for 1 hour at approximately 50° C. and then the pH adjusted to 7.5 with sulfuric acid. To this mixture is added 21.76 parts of 40 percent aqueous glyoxal and the resulting mixture heated to 50°C. After 55 minutes at a temperature of 50–53° C. the viscosity of the solution reaches a Gardner-Holdt value above S. The resulting resin is diluted with 200 parts of water and the pH adjusted to 5.0 with sulfuric acid. The resulting product contains approximately 9.9 percent solids and has a Brookfield viscosity of 10.9 c.p.s. at 25° C.

Bleached kraft paper is prepared from the above wet strength resin as described in Example 1. Samples of the paper are tested for both dry and wet strength after conditioning for over 24 hours at 73° F. and 50 percent relative humidity. Wet tensile strengths are determined after soaking the paper for 10 seconds and also for 2 hours in distilled water at room temperature. The results of these tests are tabulated below.

| Percentage of Resin Contained in Paper | Wet Tensile Percent of Dry Tensile 10 second soak | Wet Tensile Percent of Dry Tensile 2 hour soak |
|---|---|---|
| 0.5 | 18.4 | 7.7 |
| 1.0 | 26.1 | 9.6 |
| 2.0 | 28.3 | 9.8 |

EXAMPLE 11

This example shows the use of the resin described in Example 1 as a flocculant.

A sample of the resin solution prepared in Example 1 is diluted with water to 0.1 percent solids concentration. Various amounts of the 0.1 percent solution are tested as a flocculant for aqueous suspensions of mineral solids. In each case a 5 percent aqueous suspension of mineral solids is placed in a 100 ml. graduated cylinder and treated with a measured amount of resin solution. The thus treated suspension is mixed by rotating the graduated cylinder end-over-end twenty times. The cylinder is set to rest and after 15 minutes the volume of supernatant liquid measured. A sample of the supernatant liquid is then withdrawn and tested for turbidity in a Klett-Summerson colorimeter. Control tests are conducted exactly the same way except no resin solution is added. The specific mineral solid employed and the results of the tests are tabulated below

| Suspended Mineral | Resin p.p.m. of Mineral | Supernatant Volume, ml. | Turbidity[a] |
|---|---|---|---|
| Kaolin[b] | 0 | 38 | 33 |
| (suspension | 250 | 43 | 23 |
| adjusted to | 500 | 55 | 19 |
| pH 4.5 ) | 750 | 56 | 16 |
|  | 1000 | 57.5 | 14 |
| Silica[c] | 0 | 0 |  |
|  | 260 | 82 | 785 |
|  | 500 | 73.5 | 158 |
|  | 750 | 69 | 25 |
|  | 1000 | 75 | 15.5 |

[a] In Klett units.
[b] Average particle size about 5 microns.
[c] Average particle size about 1.1 microns.

EXAMPLE 12

This example shows the use of the resin described in Example 1 as a retention aid in paper making.

A sample of the resin solution prepared in Example 1 is diluted with water to 0.005 percent solids concentration. Various amounts of the 0.005 percent solution are tested as a retention aid in making kraft paper.

In each case bleached kraft pulp is beaten to 750 ml. freeness (S.R.) at 2.5 consistency. An amount of pulp slurry equivalent to 75 parts of dry pulp is adjusted to a pH of 6.5 with 10 percent $H_2SO_4$, 7.5 parts of 10 percent aqueous papermakers alum is added and the slurry adjusted to a pH of 4.5. Kaolin filler is added in an amount of 7.5 parts and the slurry stirred for 5 minutes. The slurry is then diluted to 0.5 percent consistency with water at a pH of 5 containing 60 p.p.m. of alum in the proportioner of a Noble-Wood handsheet machine. Portions of the slurry equivalent to about 2.5 parts of pulp are treated with measured amounts of the 0.005 percent resin solution and stirred 30 seconds. The thus treated slurries are diluted to 0.05 percent consistency in the deckle box of the handsheet machine and formed into handsheets. On some of the test runs the alum is omitted and the pH adjusted to 8.0 with sodium hydroxide. Control samples are run both with and without the alum.

The percentage of filler retained is calculated in each case from the ash content of the handsheet and the ash content of the kaolin filler. The results of the tests are tabulated below.

| Paper making Slurry | Resin, percent of pulp | Percent of Added Filler Retained |
|---|---|---|
| pH 4.5 | None | 27.5 |
| (1 percent alum) | 0.01 | 41 |
|  | 0.05 | 51 |
|  | 0.10 | 53 |
| pH 8.0 | None | 15 |
| (no alum) | 0.01 | 18 |
|  | 0.05 | 35 |
|  | 0.10 | 41 |

I claim:

1. An aminopolyamide—acrylamide—polyaldehyde resin prepared by reacting
   1. an aminopolyamide, resulting from the condensation of
      (a) a polyalkylene polyamine having the general formula selected from

and

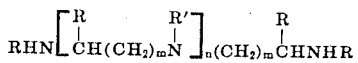

where each R independently of each other is selected from hydrogen and lower alkyl radicals, R' is selected from hydrogen and amino substituted lower alkyl radicals, m is an integer from 1 to 5 and n is at least 1 with (b) an organic polybasic carboxylic acid or anhydride, in a ratio of from about 0.5 to about 2.0 moles of polyalkylene polyamine per mole of acid, with 2. an amount of unsaturated amide, selected from the group consisting of acrylamide and lower alkyl substituted acrylamides, sufficient to react with substantially all of the primary and secondary amino groups in the aminopolyamide and 3. reacting the resulting aminopolyamide—unsaturated amide adduct with from about 0.05 to about 5.0 moles of an organic compound containing at least two free aldehyde groups per mole of unsaturated amide present in said adduct.

2. The product of claim 1 wherein the aminopolyamide is the reaction product of the condensation reaction of tetraethylenepentamine with adipic acid.

3. The product of claim 1 wherein the aminopolyamide is the reaction product of the condensation reaction of tetraethylenepentamine with itaconic acid.

4. The product of claim 1 wherein the aminopolyamide is the reaction product of the condensation reaction of tetraethylenepentamine with isophthalic acid.

5. The product of claim 1 wherein the organic compound containing at least two free aldehyde groups is glyoxal.

6. The product of claim 1 wherein the organic compound containing at least two free aldehyde groups is glutaraldehyde.

7. The product of claim 1 wherein the acrylamide is a lower alkyl substituted acrylamide.

8. The process of preparing an aminopolyamide-acrylamide-polyaldehyde resin which comprises the steps of
   1. reacting a polyalkylene polyamine having the general formula selected from

and

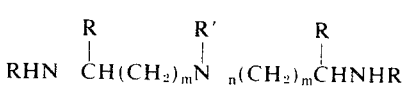

where each R independently of each other is selected from hydrogen and lower alkyl radicals, R' is selected from hydrogen and amino substituted lower alkyl radicals, m is an integer from 1 to 5 and $n$ is at least 1, with a polybasic carboxylic acid to form an aminopolyamide, in a ratio of from about 0.5 to about 2.0 moles of polyalkylene polyamine per mole of acid, 2) reacting the resulting aminopolyamide with an amount of unsaturated amide, selected from the group consisting of acrylamide and lower alkyl substituted acrylamides, sufficient to react with substantially all of the primary and secondary amino groups in the aminopolyamide, and, 3) reacting the resulting aminopolyamide-unsaturated amide adduct with from about 0.05 to about 5.0 moles per mole of unsaturated amide present in said adduct of an organic compound containing at least two free aldehyde groups.

9. The process of claim 8 wherein up to 50 percent of the amine groups in the aminopolyamide have been treated with an alkylating agent selected from the group consisting of alkyl sulfates and epihalohydrins.

10. The process of claim 8 wherein the polyalkylene polyamine is a polyethylene polyamine.

11. The process of claim 10 wherein the polyethylene polyamine is tetraethylenepentamine.

12. The process of claim 8 wherein the polybasic carboxylic acid is a dicarboxylic acid.

13. The process of claim 12 wherein the dicarboxylic acid is adipic acid.

14. The process of claim 8 wherein the unsaturated amide is acrylamide.

15. The process of claim 8 wherein the organic compound containing at least two free aldehyde groups is glyoxal.

16. A paper treating composition comprising an aqueous solution of up to 15 percent solids by weight based on the weight of the water of the aminopolyamide—acrylamide—polyaldehyde resin of claim 1.

17. Paper treated with from about 0.05 percent to about 5 percent by weight based on the weight of the paper of the aminopolyamide—acrylamide—polyaldehyde resin of claim 1 to impart wet strength.

18. The process of treating paper to impart wet strength which comprises treating said paper with from about 0.05 percent to about 5 percent by weight based on the weight of the paper of the aminopolyamide—acrylamide—polyaldehyde resin of claim 1 and allowing the treated paper to dry.

19. The process of claim 18 wherein said treating is conducted during the formation of said paper.

20. The process of flocculating solid particles suspended in water which comprises adding an amount of the aminopolyamide—acrylamide—polyaldehyde resin of claim 1 to said suspension sufficient to flocculate said particles.

21. Paper treated with less than about 0.05 percent by weight based on the weight of the paper of the aminopolyamide-acrylamide-polyaldehyde resin of claim 1 to aid retention of mineral fillers.

22. The process of treating paper to aid the retention of mineral fillers which comprises treating said paper with less than about 0.05 percent by weight based on the weight of the paper of the aminopolyamide-acrylamide-polyaldehyde resin of claim 1 and allowing the treated paper to dry.

PO-1050
(5/69)

UNITED STATES PATENT OFFICE
CERTIFICATE OF CORRECTION

Patent No. 3,607,622          Dated September 21, 1971

Inventor(s) Herbert H. Espy

It is certified that error appears in the above-identified patent and that said Letters Patent are hereby corrected as shown below:

Col. 3, line 11 of Printed Patent; Page 6, line 12 of Spec. -
    "80°C" should read --about 80°C--

Col. 5, line 15 & 16 of Printed Patent;
    "The resulting mixture is heated at 70 to 75°C. for 2 hours and then cooled" is repeated.

Col. 7, line 21 of Printed Patent; Page 14, line 28 of Spec. -
    The word "Sixty-two" is omitted should read --Sixty-two (62)--

Col. 8, line 56 of Printed Patent; Page 17, line 30 of Spec. -
    "70-75°A C" should read --70-75°C--

Col. 9, line 41 of Printed Patent; Page 19, line 20 of Spec. -
    under the tabulation second column "260" should read --250--

Signed and sealed this 4th day of April 1972.

(SEAL)
Attest:

EDWARD M. FLETCHER, JR.          ROBERT GOTTSCHALK
Attesting Officer          Commissioner of Patents